United States Patent [19]

Maesaka et al.

[11] Patent Number: 5,294,298
[45] Date of Patent: Mar. 15, 1994

[54] SPRAY-DRYING GRANULATION APPARATUS

[75] Inventors: Munetoshi Maesaka, Yokohama; Takashi Itoh, Fujieda; Shizuo Aishima; Masaaki Ohkawara, both of Yokohama, all of Japan

[73] Assignee: Ohkawara Kakohki Co., Ltd., Yokohama, Japan

[21] Appl. No.: 953,094

[22] Filed: Sep. 29, 1992

[51] Int. Cl.$^5$ ............................................. B01D 1/18
[52] U.S. Cl. .................... 159/4.01; 159/4.08; 159/48.1; 159/DIG. 3; 34/57 A
[58] Field of Search ............... 159/4.01, 4.08, 48.1, 159/4.2, 4.4, DIG. 3; 34/57 A

[56] References Cited

U.S. PATENT DOCUMENTS

| | | | |
|---|---|---|---|
| 2,460,546 | 2/1949 | Stephanoff | 159/48.1 |
| 3,081,946 | 3/1963 | Soloff | 159/4.01 |
| 3,142,862 | 8/1964 | Guldman | 159/4.08 |
| 3,621,902 | 11/1971 | Okada et al. | 159/4.01 |
| 4,380,491 | 4/1983 | Joy et al. | 159/4.01 |
| 4,571,311 | 2/1986 | Ferguson et al. | 159/4.01 |
| 4,600,472 | 7/1986 | Pitchon et al. | 159/48.1 |
| 5,100,509 | 3/1992 | Pisecky et al. | 159/4.08 |
| 5,149,398 | 9/1992 | Shaffer et al. | 159/4.01 |

FOREIGN PATENT DOCUMENTS 869143  5/1961  United Kingdom ............... 159/4.01

Primary Examiner—Wilbur Bascomb, Jr.
Attorney, Agent, or Firm—Armstrong, Westerman, Hattori, McLeland & Naugton

[57] ABSTRACT

The present invention provides a spray-drying granulation apparatus having a chamber comprising (a) an upper section which is a spray-drying section for spraying a feed solution from a nozzle and drying the formed droplets with hot air and (b) a lower section which is a fluidized granulation section, in which apparatus there is used, as the nozzle for spraying a feed solution, a two-fluid pressure nozzle comprising a centrifugal pressure nozzle for spraying a feed solution and a cylindrical pipe for blowing out a high-speed gas, provided around the centrifugal pressure nozzle. This spray-drying granulation apparatus enables spraying of even a feed solution of large volume with only one nozzle. Further with the two-fluid pressure nozzle of the apparatus, there is no need of replacement of nozzle parts when the feed rate, concentration, viscosity, kind, etc. of the feed solution are changed greatly, because the diameters of droplets formed by spraying can be controlled by controlling the speed of the high-speed gas, while in the conventional nozzles the replacement of nozzle parts such as orifice, core and the like has been necessary when the above change is made.

2 Claims, 6 Drawing Sheets

SPRAY-DRYING GRANULATION APPARATUS

BACKGROUND OF THE INVENTION AND THE RELATED ART

The present invention relates to a spray-drying granulation apparatus which accommodates both a spray dryer and a granulator in one chamber.

Figure 6:
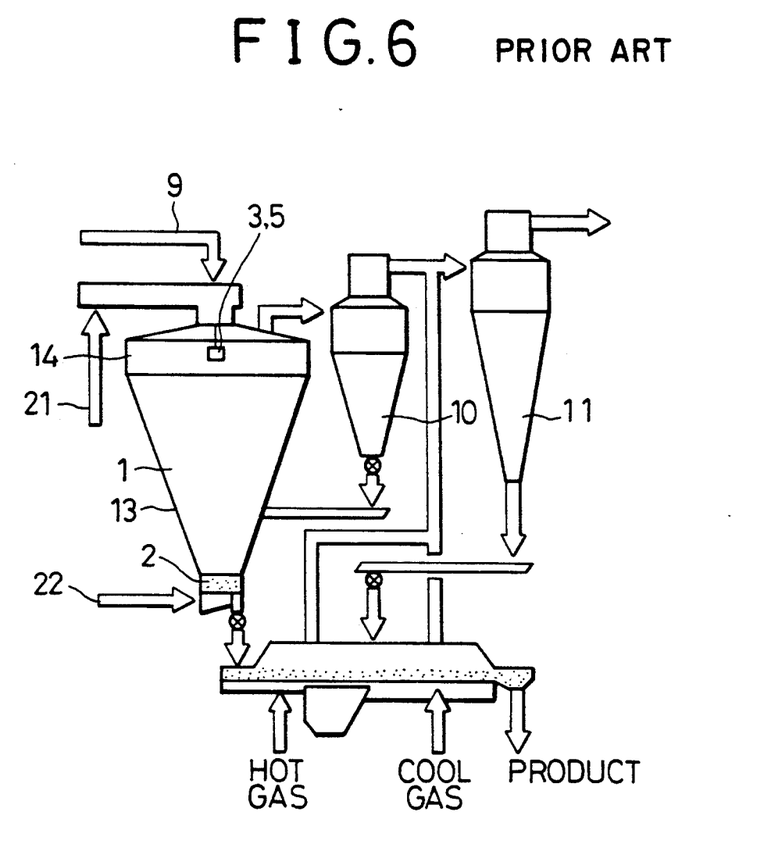
FIG. 6 is a schematic view showing a spray-drying granulation apparatus.
Figure 7:
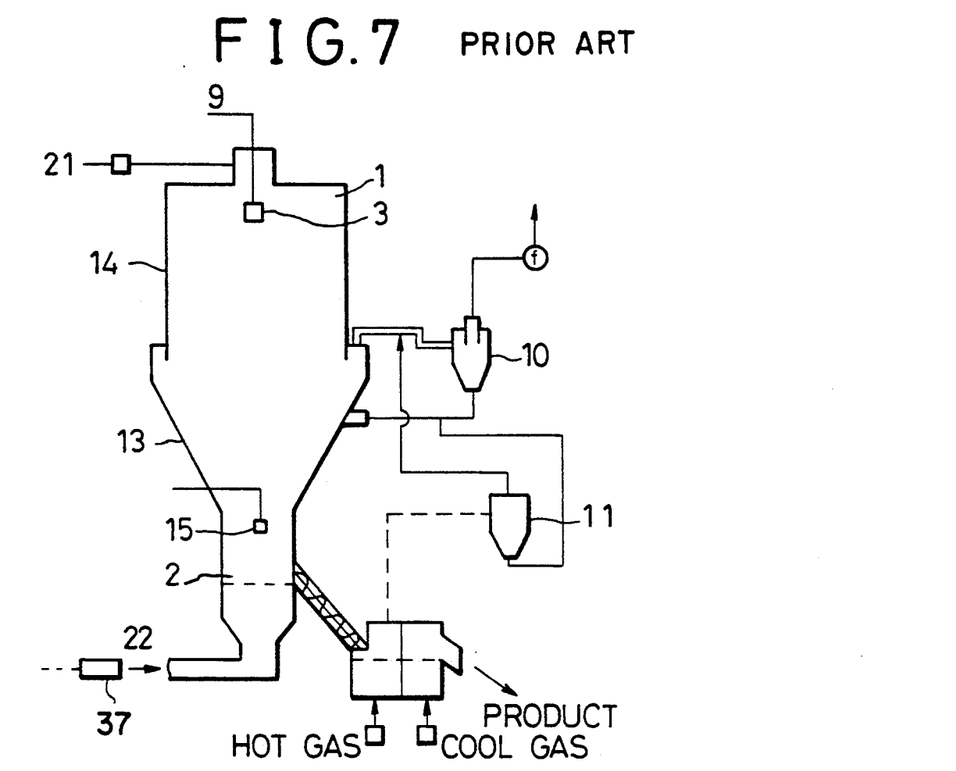
FIG. 7 is a schematic view showing other spray-drying granulation apparatus.
Figure 8:
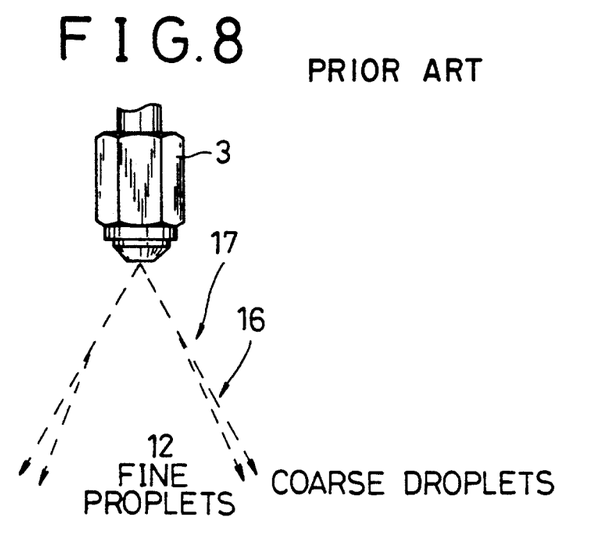
FIG. 8 is a view showing the conventional centrifugal pressure nozzle.

As the spraying nozzle of spray-drying granulation apparatus, there have conventionally been used a centrifugal pressure nozzle 3 as shown in FIG. 8 which has, at the back of the orifice, a section for generating a strong whirl flow of feed solution (this section is called core, whirl chamber or the like) to provide fine droplets and give a hollow cone-shaped spray pattern for good contact with hot air. Such a centrifugal pressure nozzle is used in, for example, a spray-drying granulation apparatus as shown in FIG. 6 and a spray-drying granulation apparatus as shown in FIG. 7 U.S. Pat. No. 5,044,093) in which a nozzle for binder spraying is provided in the fluidized granulation section in addition to the centrifugal pressure nozzle provided in the spray-drying section. However, there has been used no spraying nozzle capable of giving a narrow spraying angle and droplets having appropriately distributed diameters.

Generally in spray dryers, it is necessary to stabilize the temperature inside the spray-drying chamber, at the start of the operation, in order to prevent the product from scorching caused by excessive heating and assure thermal protection for the subsequent steps. For this purpose, water is sprayed using the same centrifugal pressure nozzle.

In conducting the water spraying, the amount of the water sprayed must correspond to the water content in feed solution. Since the water content in feed solution is generally 30–80% by weight, the amount of water sprayed is also 30–80% by weight based on the amount of feed solution to be sprayed. Consequently, the spraying pressure is reduced to about 10–70% because of the characteristics possessed by the centrifugal pressure nozzle although the pressure varies depending upon the viscosity of feed solution, etc. As a result, the water droplets formed are large making the drying difficult, and they stick to the inner wall of drying chamber in a liquid state and wet the wall. When the feed solution is sprayed successively, the dried powder particles stick thereonto and are solidifed.

Figure 10:
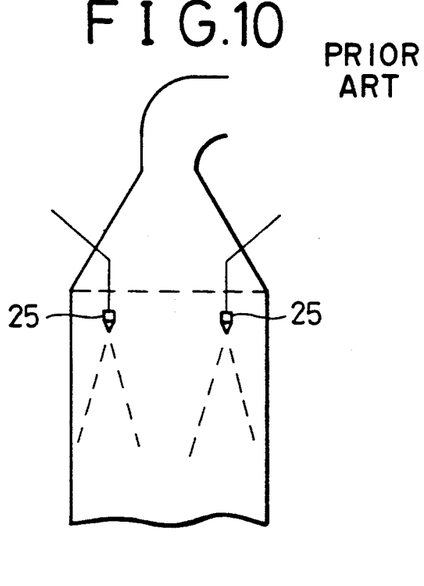
FIG. 10 is a schematic view of a conventional spray-drying granulation apparatus using a plurality of spraying nozzles.
Figure 11:
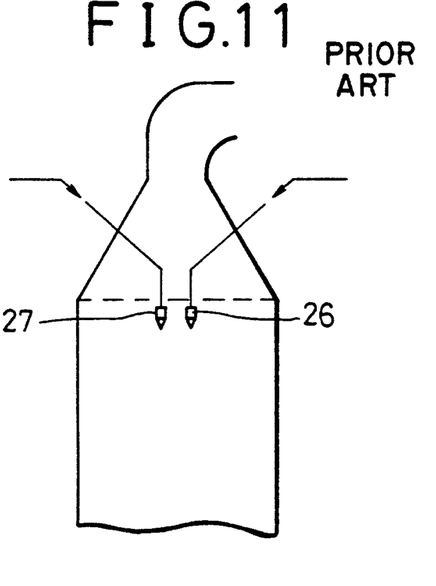
FIG. 11 is a schematic view of a conventional spray-drying granulation apparatus using a nozzle for water spraying, in addition to a nozzle for feed solution spraying.

Hence, means as shown in FIG. 10 and FIG. 11 have been employed conventionally.

FIG. 10 is a spray-drying granulation apparatus using a plurality of centrifugal pressure nozzles. In this apparatus, a plurality of centrifugal pressure nozzles 25 are provided at the top of the spray-drying chamber and, when water spraying is conducted, water is sprayed with only part of the nozzles 25 to avoid lower-pressure spraying.

FIG. 11 is a spray-drying granulation apparatus using a nozzle 26 for water spraying, independently from a nozzle 27 for feed solution spraying.

Figure 9:
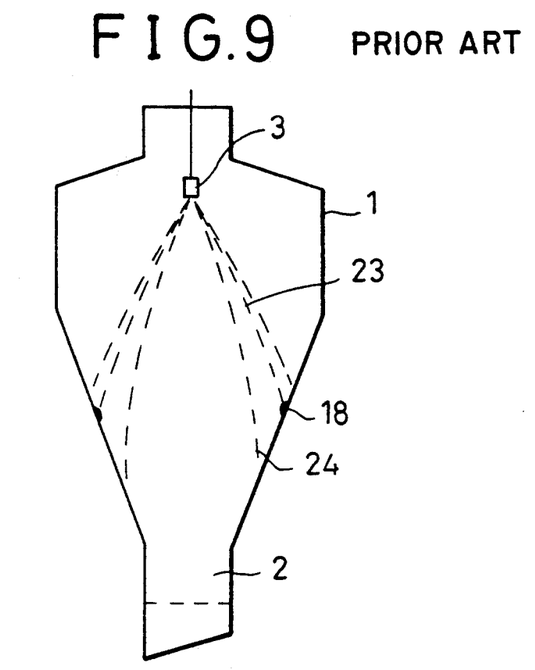
FIG. 9 is a view showing a spray-drying granulation apparatus using a centrifugal pressure nozzle.

In the conventional centrifugal pressure nozzle 3 mentioned above, the spraying angle $\alpha$ is generally large and 40°–90°, as shown in FIG. 8 and FIG. 9. When spraying is made from the centrifugal pressure nozzle 3, the inside 12 of the resulting hollow cone comes to have a negative pressure and the air 17 flows from the outside 16 of the hollow cone to the inside 12. This air movement allows the fine droplets 24 to be concentrated at the inner surface of the cone with the coarse droplets 23 remaining at the outer surface of the cone. The fine droplets 24 are dried easily. Meanwhile, the coarse droplets 23 are hard to dry, remain at the outer surface of the spray pattern, reach the lower portion 18 of the spray-drying section 1 with a large amount of water contained therein, and stick onto and accumulate at the lower portion 18, as shown in FIG. 9. As a result, the yield of product is low and, when the product is a substance of low heat resistance, such as food, medicine, organic compound or the like, the product gives rise to thermal deterioration, resulting in reduced quality. When excessive drying is made in order to avoid the above sticking and accumulation, the water content in each droplet is too low and granulation is not promoted.

In the conventional pressure nozzle having no section for generating a strong whirl flow, at the back of the orifice, the spraying angle can be made small. However, the droplets are too coarse and reach the fluidized granulation section without being substantially dried; as a result, no powder is produced and no fluidized layer is formed.

FIG. 6 is a schematic view of a known spray-drying granulation apparatus. When there is used a centrifugal pressure nozzle 3 as the spraying nozzle of the apparatus, granulation is not promoted unless each of the powder particles formed by spray-drying contain an appropriate amount (about 3–15% by weight) of water. When each powder particle is allowed to contain an appropriate amount of water, the coarse droplets formed by spraying are not sufficiently dried and stick onto the inner wall of the apparatus chamber because the spraying angle of nozzle is large.

Sticking can be avoided by making large the height of the straight cylindrical portion 14 of the apparatus chamber. However, it makes small the granulation rate in the fluidized granulation layer and consequently there is required a large fluidized layer. In the case of, in particular, substances (e.g. amino acid-containing substance) whose granulation is possible in a narrow water content range and which tend to stick outside said water content range, a high granulation rate is employed while avoiding sticking; hence, the selection of operating conditions is difficult.

FIG. 7 is a schematic view of other known spray-drying granulation apparatus. In this apparatus, the height of the straight cylindrical portion 14 is made large in order to solve the above-mentioned sticking problem; as a result, the powder particles have a low water content and the granulation rate is low. Hence, a two-fluid nozzle for binder spraying is provided for improved granulation. This has solved the sticking problem, but has made the apparatus larger and requires a larger space for apparatus installation. Further, use of a two-fluid pressure nozzle for binder spraying requires a large amount of compressed air. Furthermore, the apparatus cost is higher.

Further in the apparatus shown in FIG. 10, the distance between nozzles must be large and part of the nozzles uses no water. Consequently, the droplets do not spread uniformly, giving rise to humidity variation between droplets. Further, the nozzle(s) using no water incurs (incur) clogging.

Further in the apparatus shown in FIG. 11, the nozzle for feed solution spraying is neither cooled nor washed with water and incurs clogging with the feed solution.

SUMMARY OF THE INVENTION

The present invention is intended to solve the above-mentioned problems of the prior art by using a two-fluid pressure nozzle of particular structure in the spray-drying section of spray-drying granulation apparatus.

According to the present invention there is provided a spray-drying granulation apparatus having a chamber comprising (a) an upper section which is a spray-drying section for spraying a feed solution from a nozzle and drying the formed droplets with hot air and (b) a lower section which is a fluidized granulation section, in which apparatus there is used, as the nozzle for spraying a feed solution, a two-fluid pressure nozzle comprising a centrifugal pressure nozzle for spraying a feed solution and a cylindrical pipe for blowing out a high-speed gas, provided around the centrifugal pressure nozzle.

In the spray-drying granulation apparatus of the present invention, it is preferable to feed a fine powder around the two-fluid pressure nozzle.

DETAILED DESCRIPTION OF THE PREFERRED EMBODIMENTS

Figure 1:
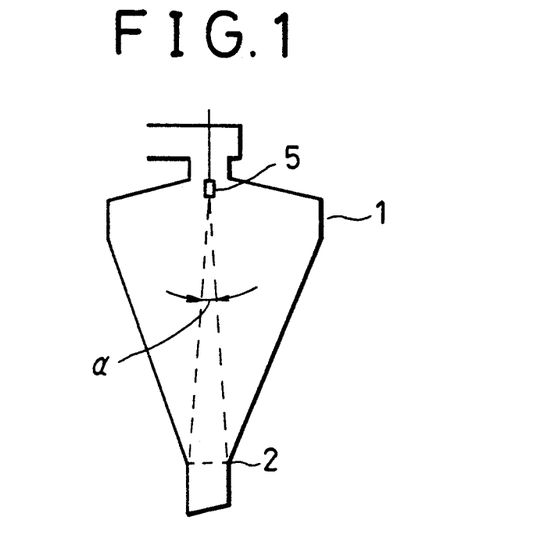
FIG. 1 is a schematic view showing the spray-drying granulation apparatus of the present invention.
Figure 2:
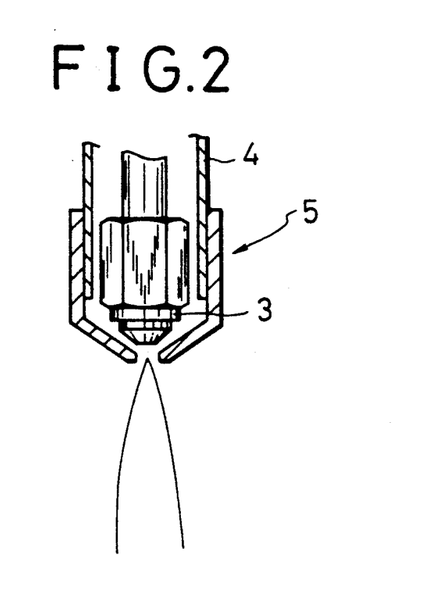
FIG. 2 is a schematic cross-sectional view of the two-fluid pressure nozzle used in the apparatus of the present invention.

FIG. 1 is a schematic view showing the spray-drying granulation apparatus of the present invention, and FIG. 2 is a schematic cross-sectional view of the two-fluid pressure nozzle used in the apparatus of the present invention.

The present invention resides in a spray-drying granulation apparatus having a chamber comprising an upper section which is a spray-drying section 1 and a lower section which is a fluidized granulation section 2, in which apparatus there is used, as the nozzle for spraying a feed solution, a two-fluid pressure nozzle 5 comprising a centrifugal pressure nozzle 3 for spraying a feed solution and a cylindrical pipe 4 for blowing out a high-speed gas, provided around the centrifugal pressure nozzle.

The two-fluid pressure nozzle used in the apparatus of the present invention is a modification of centrifugal pressure nozzle and fundamentally has the same capabilities as the centrifugal pressure nozzle.

The following empirical equations (1) and (2) hold regarding the spraying properties of the centrifugal pressure nozzle.

$$D_d = c_1 \cdot P^{-0.2 \sim -0.3} \cdot D^{0.5 \sim 0.65} \cdot \mu^{0.15 \sim 0.22} \cdot \sigma^{0.6 \sim 0.7} \quad (1)$$

($D_d$ is a droplet diameter, P is a spraying pressure, D is a nozzle orifice diameter, $\mu$ is a liquid viscosity, $\sigma$ is a liquid surface tension, and $c_1$ is a constant.)

$$W = c_2 \cdot P^{0.5} \cdot D^2 \quad (2)$$

(W is a liquid flow rate, P is a spraying pressure, D is a nozzle orifice diameter, and $c_2$ is a constant.)

As is clear from the equations (1) and (2), the droplet diameter $D_d$ and the liquid flow rate W are automatically determined when the spraying pressure (liquid pressure) P is determined. In this case, decrease in liquid pressure P reduces liquid flow rate W in proportion to the decrease and increases droplet diameter $D_d$ in reverse proportion to the decrease. In the two-fluid pressure nozzle of the present invention, the droplet diameter is made smaller by the high-speed gas stream.

Figure 14:
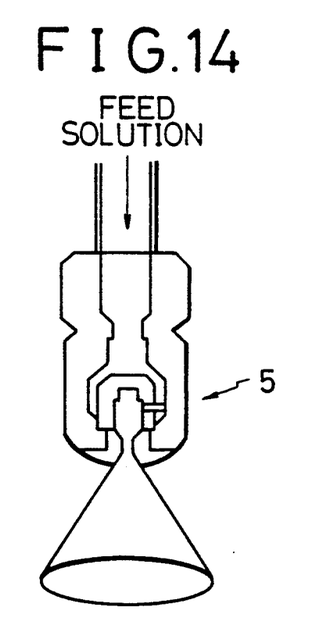
FIG. 14 is a view showing a state in which a feed solution is fed from a centrifugal pressure nozzle in a hollow cone shape for primary atomization.

That is, the two-fluid pressure nozzle gives rise to atomization in two stages. First, primary atomization is caused by the pressure possessed by the liquid per se sprayed from the centrifugal pressure nozzle, whereby initial conditions are established. In this case, the above equations (1) and (2) are applied. In the primary atomization, the liquid is injected from the orifice of the two-fluid pressure nozzle in a hollow cone shape, as shown in FIG. 14.

Next, in the present invention, a high-speed gas is blown off from the front end of the cylindrical pipe to collide with the droplets formed in the primary atomization, to give rise to secondary atomization.

Use of the two-fluid pressure nozzle having the above-mentioned functions enables spraying of even a feed solution of large volume with only one nozzle. Further, use of the two-fluid pressure nozzle enables control of droplet diameter by control of the speed of high-speed gas and consequently requires no replacement of nozzle parts (in the conventional nozzle, replacement of nozzle parts such as orifice, core and the like has been necessary when the feeding rate, concentration, viscosity, kind, etc. of feed solution are changed greatly).

The two-fluid pressure nozzle 5, as compared with the conventional centrifugal pressure nozzle, gives a narrow spraying angle and droplets of widely distributed diameters. When a nozzle giving droplets of widely distributed diameters is used for spray-drying, fine droplets become sufficiently dried fine particles and coarse droplets become particles having slightly wet surfaces and a high water content. The number of the fine particles is far larger than the number of the coarse droplets.

Figure 3:
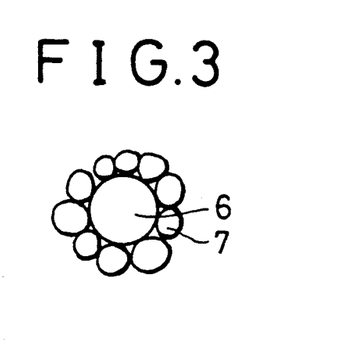
FIG. 3 is a view showing a state in which granulation is made using the apparatus of the present invention.

Hence, as shown in FIG. 3, when the fine particles and the coarse particles come in contact, they agglomerate in such a state that a coarse particle 6 as nucleus, having a slightly wet surface is covered with dry fine particles 7, whereby granulation is promoted. Each of the resulting granules has a dry surface; therefore, sticking of granules having wet surfaces onto the inner wall of the spray-drying section can be avoided.

Further, as shown in FIG. 1, the two-fluid pressure nozzle gives a narrow spraying angle α; therefore, the coarse particles 6 having wet surfaces reach the particles in the fluidized layer without directly hitting the inner wall of the spray-drying section; therefore, sticking of coarse particles 6 having wet surfaces onto the inner wall of the spray-drying section can be avoided.

In spray-drying granulation apparatuses, the spraying angle is ideally 5°-15°. Meanwhile, the spraying angle obtained with the two-fluid pressure nozzle of the present invention is 8°-30° and, when compared with 40°-90° obtained with the conventional centrifugal pressure nozzle, is far small.

Figure 4:
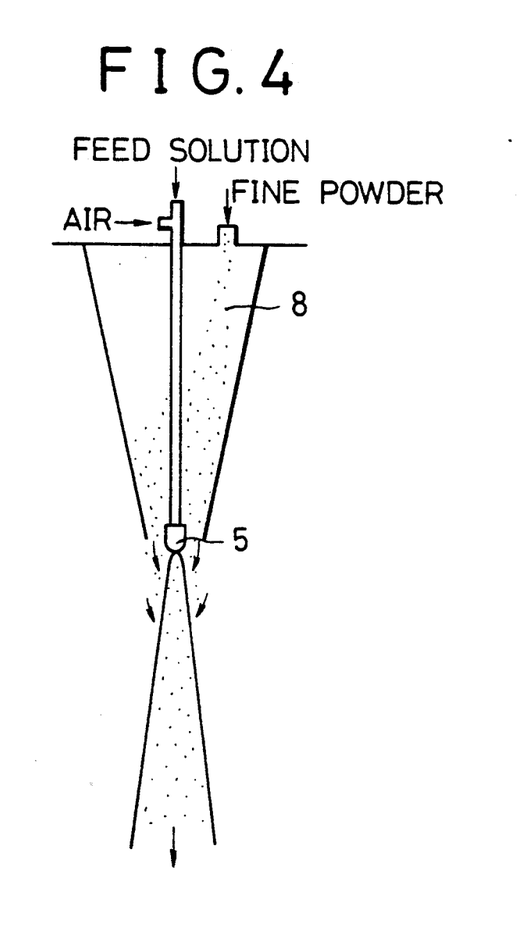
FIG. 4 is a view showing a state in which a fine powder is fed in the apparatus of the present invention.
Figure 5:
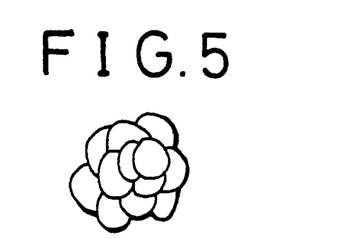
FIG. 5 is a view showing the shape of a granule formed using the apparatus of the present invention.
Figure 12:
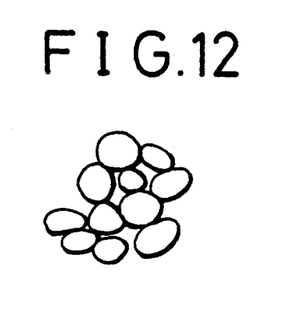
FIG. 12 is a view showing the shape of a granule formed by a conventional spray-drying granulation apparatus.
Figure 13:
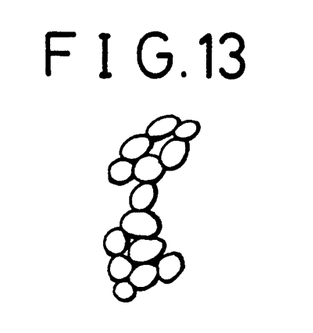
FIG. 13 is a view showing the shape of other granule formed by a conventional spray-drying granulation apparatus.

As shown in FIG. 4, when there is fed, around the two-fluid pressure nozzle 5, a fine powder 8 which is a fine powder recovered from the exhaust gas in the cyclone, the bag filter, etc. or a fine powder of an additive (e.g. excipient, lubricant), the fine powder 8 is sucked into the inside of the spray pattern because said inside has a negative pressure. As a result, the droplets and the fine powder 8 come into contact, making the agglomeration of droplets easy. Each of the resulting granules is an agglomerate of intimately contacted particles, and has a high bulk density and a high particle density. Meanwhile, each granule obtained using the conventional spray-drying granulation apparatus, as shown in FIG. 12 and FIG. 13, is often an agglomerate of point-contacted particles, has a grape-cluster shape, has gaps between particles, and has a low bulk density and a low particle density.

With the two-fluid pressure nozzle, sticking of undried particles onto the inner wall of the apparatus chamber can be avoided even when the spraying pressure is lower during water spraying at the start or end of operation, because a high-speed gas is fed around the centrifugal pressure nozzle and water is atomized finely and dried completely.

The present invention is hereinafter described in more detail by way of Examples. However, the present invention is by no means restricted to these Examples.

EXAMPLE 1

FIG. 6 is a schematic view showing a known spray-drying granulation apparatus equipped with a two-fluid pressure nozzle. In FIG. 6, the feed solution fed from a feed solution line 9 is sprayed from a centrifugal pressure nozzle, and a high speed gas 21 blown out through a cylindrical pipe provided around the pressure nozzle 1 and enters a spray-drying section 1; granulation is conducted in a fluidized granulation section 2 with fluidization gas 22; then, drying and cooling are conducted, whereby a product is obtained. Meanwhile, the fine powder present in the exhaust gas is recovered by a first cyclone 10 and a second cyclone 11 and then returned to a conical section 13. (In Example 3 described later, the fine powder recovered in the first cyclone 10 can be fed around the two-fluid pressure nozzle 5.)

A test was conducted according to the above-mentioned flow using an apparatus having a dimension shown in FIG. 1. As the two-fluid pressure nozzle 5, there was used a nozzle which comprised a centrifugal pressure nozzle (Model SX manufactured by Spraying System Co.) and which was capable of blowing out a high-speed gas from around the centrifugal pressure nozzle. The nozzle orifice had a diameter of 0.89 mm.

The feed solution for obtaining granules was an aqueous solution containing 40% by weight of dextrin, having a viscosity of 100 cp. Operation was conducted at a hot air (for spray drying) temperature of 200° C., a hot air (for fluidized granulation) temperature of 60° C. and an exhaust gas temperature of 75° C. The average particle diameter and bulk density of the product obtained are shown in Table 1. As is appreciated from Table 1, the average particle diameter of the product was larger than those of Comparative Examples although the same fluidized granulation section 2 was used in Example 1 and Comparative Examples.

EXAMPLE 2

A test was conducted using the same apparatus as in Example 1 under the same conditions as in Example 1 except that the air-feeding pressure was changed to 0.3 kg/cm². The average particle diameter of the product obtained was 210 μm. It is appreciated from this Example that a larger air-feeding pressure gives a product of smaller average particle diameter.

EXAMPLE 3

A test was conducted using the same apparatus as in Example 1 under the same conditions as in Example 1 except that, as shown in FIG. 4, the fine powder recovered in the first cyclone was fed around the two-fluid pressure nozzle 5. The average particle diameter of the product obtained was 330 μm and larger than that obtained in Example 1 in which no fine powder was fed, and the bulk density was 0.54 g/ml and also larger.

COMPARATIVE EXAMPLE 1

A test was conducted using the same apparatus as in Example 1 under the same conditions as in Example 1 except that there was used, as the nozzle for feed solution spraying, a centrifugal pressure nozzle having an orifice diameter of 0.89 mm (Model SX manufactured by Spraying System Co.). The results are shown in Table 1.

TABLE 1

| Item | | Example | | | Comparative Example | | | |
|---|---|---|---|---|---|---|---|---|
| | | 1 | 2 | 3 | 1 | 2 | 3 | 4 |
| Spraying nozzle | | Two-fluid pressure nozzle | Two-fluid pressure nozzle | Two-fluid pressure nozzle | Centrifugal pressure nozzle | Centrifugal pressure nozzle | Centrifugal pressure nozzle | Centrifugal pressure nozzle |
| Diameter of spray-drying section | mm | 2200 | 2200 | 2200 | 2200 | 2200 | 2200 | 2200 |
| Height of straight cylindrical portion of spray-drying section | mm | 800 | 800 | 800 | 800 | 800 | 800 | 3000 |

TABLE 1-continued

| Item | | Example | | | Comparative Example | | | |
|---|---|---|---|---|---|---|---|---|
| | | 1 | 2 | 3 | 1 | 2 | 3 | 4 |
| Height of conical portion | mm | 1900 | 1900 | 1900 | 1900 | 1900 | 1900 | 1900 |
| Diameter of fluidized granulation section | mm | 350φ | 350φ | 350φ | 350φ | 350φ | 350φ | |
| Feed solution-feeding rate | kg/hr | 80 | 80 | 80 | 80 | 87 | 80 | 80 |
| Feed solution-spraying pressure | kg/cm² | 40 | 40 | 40 | 40 | 42 | 36 | 40 |
| Binder-feeding rate | kg/hr | — | — | — | — | — | — | 2.4 |
| Air-feeding rate | kg/hr | 50 | 50 | 50 | — | — | — | — |
| Air-feeding pressure | kg/cm² | 0.2 | 0.3 | 0.2 | — | — | — | — |
| Air-blowing speed | m/sec | 110 | 110 | 110 | — | — | — | — |
| Nozzle spraying angle | deg | 10 | 10 | 10 | 75 | 75 | 75 | 75 |
| Average particle diameter of product | μm | 300 | 210 | 330 | 230 | 250 | 280 | 230 |
| Bulk density of product | g/ml | 0.5 | 0.5 | 0.54 | 0.5 | 0.5 | 0.5 | 0.46 |
| Sticking inside chamber | | | | | | | | |
| During operation with feed solution | | No sticking | No sticking | No sticking | No sticking | Sticking of small amt | Sticking of large amt | No sticking |
| During operation with water | | No sticking | No sticking | No sticking | Sticking of water droplets | Sticking of water droplets | Sticking of water droplets | Sticking of water droplets |
| Remarks | | | | Fine powder recovered by cyclone was used | | | Orifice diameter of spraying nozzle was 0.97 mm | Nozzle for binder spraying was used |

COMPARATIVE EXAMPLE 2

A test was conducted under the same conditions as in Comparative Example 1 except that the feed solution-feeding rate was changed to 87 kg/hr and the feed solution-spraying pressure was changed to 42 kg/cm². The product obtained had an average particle diameter of 250 μm which was larger than in Comparative Example 1. However, a small amount of an undried substance stuck onto the inner wall of the conical portion 13.

COMPARATIVE EXAMPLE 3

A test was conducted under the same conditions as in Comparative Example 1 except that the nozzle orifice diameter was changed to 0.97 mm and the feed solution-spraying pressure was changed to 36 kg/cm². The product obtained had an average particle diameter of 280 μm. However, a large amount of an undried substance sticked onto the inner wall of the conical portion 13.

COMPARATIVE EXAMPLE 4

There was used other spray-drying granulation apparatus whose schematic view is shown in FIG. 7. In this apparatus, the height of the straight cylindrical portion was increased to 3,000 mm in order to avoid sticking onto the inner wall of the apparatus; moreover, a binder-spraying nozzle 15 was provided, for improved granulation, in the fluidized granulation section 2 because the water content in powder was low and the granulation rate was small. As the binder, there was used an aqueous solution containing 40% by weight of dextrin, which was the same as the feed solution; a two-fluid pressure nozzle was used for spraying of the binder; and the air used for binder spraying had a pressure of 1 kg/cm² and was fed at a rate of 300 Nl/min. In this apparatus, when the binder-feeding rate was 3.0 kg/hr, the product obtained had an average particle diameter of 300 μm; however, when the rate was 0 kg/hr, the average particle diameter was 60 μm and the product obtained was spherical and not granulated substantially. Fluidization gas 22 from gas source 37 is provided for fluidization in fluidized granulation section 2.

It was found that in an apparatus having the above structure, there is no sticking onto the inner wall of the chamber and it is possible to control the diameters of the particles obtained, but the spray-drying section 1 is inevitably large and binder spraying must be adopted.

As described above, with the spray-drying granulation apparatus of the present invention, use of a two-fluid pressure nozzle of particular structure for feed solution spraying enables spraying of even a feed solution of large volume with only one nozzle. Further with the two-fluid pressure nozzle of the present invention, there is no need of replacement of nozzle parts when the feed rate, concentration, viscosity, kind, etc. of the feed solution are changed greatly, because the diameters of droplets formed by spraying can be controlled by controlling the speed of the high-speed gas, while in the conventional nozzles the replacement of nozzle parts such as orifice, core and the like has been necessary when the above change is made.

The two-fluid pressure nozzle, as compared with the conventional centrifugal pressure nozzle, gives a narrow spraying angle and droplets of widely distributed diameters. Therefore, there are formed, by spray-drying with said pressure nozzle, a large number of dried fine particles and a far smaller number of slightly wet coarse particles, and each coarse particle is covered with fine particles to form agglomerates, whereby there occurs no sticking of undried particles onto the inner wall of the apparatus chamber.

With the two-fluid pressure nozzle, sticking of undried particles onto the inner wall of the apparatus chamber can be avoided even when the spraying pressure is lower during water spraying at the start or end of operation, because a high-speed gas is fed around the centrifugal pressure nozzle and water is atomized finely and dried completely.

What is claimed is:

1. A spray-drying granulation apparatus comprising:
   a chamber;
   a spray-drying section formed in said chamber at an upper portion thereof and including a nozzle for spraying a feed solution and means for supplying hot air to dry said feed solution to a powder, said nozzle using a two-fluid pressure nozzle comprising a centrifugal pressure nozzle for spraying a feed solution and a cylindrical pipe for blowing out a high-speed gas, provided around the centrifugal pressure nozzle;
   a fluidized granulation section formed in a lower portion of said chamber for fluidizing powder discharged from said spray drying section; and
   wherein the two-fluid pressure nozzle is constructed so as to form a feed solution spray having a cone angle of 8°–30°.

2. A spray-drying granulation apparatus according to claim 1, further comprising means for feeding a fine powder around the two-fluid pressure nozzle.

* * * * *